United States Patent [19]

Del Rio et al.

[11] 3,763,352

[45] Oct. 2, 1973

[54] SELF-CLEANING READ HEAD

[75] Inventors: Eddy Humberto Del Rio, Palm Beach Gardens; Donald Forman Pothier, North Palm Beach, both of Fla.

[73] Assignee: RCA Corporation, New York, N.Y.

[22] Filed: June 21, 1971

[21] Appl. No.: 155,100

[52] U.S. Cl. 235/61.11 E, 179/100.2 A, 235/61.11 R

[51] Int. Cl....... G11b 5/48, G06k 7/14, G06k 13/06

[58] Field of Search............. 235/61.11 R, 61.11 A, 235/61.11 B, 61.11 C, 61.11 D, 61.11 E, 12 N; 271/36; 179/100.2 A; 340/149 A; 250/219 DC

[56] References Cited

UNITED STATES PATENTS

| | | | |
|---|---|---|---|
| 3,069,815 | 12/1962 | Valentine | 179/100.2 A |
| 3,293,682 | 12/1966 | Giles | 179/100.2 A |
| 3,626,158 | 12/1971 | Lawrence | 235/61.11 D |
| 3,493,729 | 2/1970 | Hilal | 235/61.11 E |
| 3,114,150 | 12/1963 | Calano | 235/61.11 D |
| 3,083,012 | 3/1963 | Poland | 235/61.11 D |
| 3,640,524 | 2/1972 | Fredrickson | 271/36 |

*Primary Examiner*—Maynard R. Wilbur
*Assistant Examiner*—Robert M. Kilgore
*Attorney*—H. Christoffersen

[57] ABSTRACT

A read head and record card guiding assembly arranged so that the leading edge of a unit record card wipes the surface of the read head and is then spaced away from the surface of the read head when the card is passed beneath the read head.

6 Claims, 1 Drawing Figure

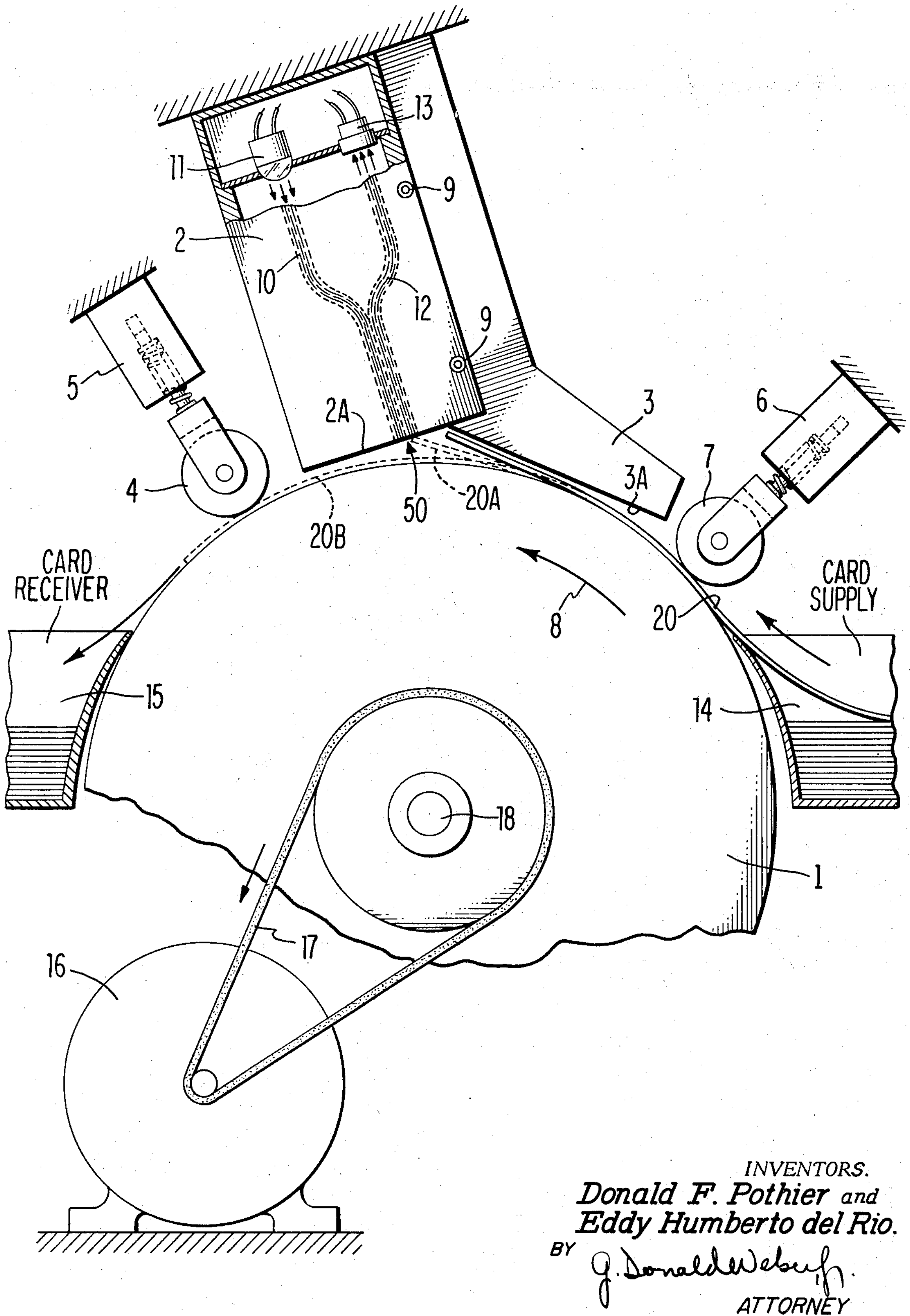
INVENTORS.
Donald F. Pothier and
Eddy Humberto del Rio.
BY G. Donald Weber, Jr.
ATTORNEY

SELF-CLEANING READ HEAD

BACKGROUND OF THE INVENTION

A problem which continually plagues the use of optical card reader assemblies (which are utilized to optically read and process tab cards or unit record cards) is the accumulation of dust and other deposits that build up on the surface of the card reader. The dust and other deposits are frequently introduced into the card reader assembly by the card stock, per se. The dust and other deposits eventually build up to the point where the optical card reader is prevented from correct operation, inasmuch as the light source or the detecting elements are covered by the dust and deposits.

In other types of reading head apparatus, such as magnetic tape or the like, the recording medium is constantly in contact with the head whereby dirt accumulation is essentially prevented by the continuous wiping of the reading surface. However, in the typical optical card reader, which operates on a reflective system, a gap is required between the reading head and the recording medium. Consequently, the wiping action normally does not occur. Moreover, the optical reader (of the reflective type) will not operate if the gap between the reading head and the recording medium is eliminated.

SUMMARY OF THE INVENTION

In one embodiment of the invention, a suitable transducer means such as an optical card reading head is disposed adjacent to a driver means such as a drum or the like. A guide means is utilized to receive information bearing elements such as cards and constrain or deform the cards such that the leading edge of the card wipes against the sensing surface of the transducer means thereby cleaning this surface by removing any accumulated dust or similar deposits thereon. The guide means and the transducer means are disposed relative to the card moving means such that after the leading edge of the card wipes the surface of the head, the card is further deformed to follow the contour of the driver means or drum and to define a gap between the card means and the transducer means whereby the card may be illuminated and the reflected light observed and detected by the transducer means.

BRIEF DESCRIPTION OF THE DRAWING

The single Drawing is a diagrammatic showing of the invention as seen from one side.

DESCRIPTION OF THE PREFERRED EMBODIMENT

A drum 1 is utilized to move cards. Drum 1, in this embodiment, rotates in the counterclockwise direction as defined by arrow 8. Drum 1 is driven by prime mover 16 which drives shaft 18 by means of belt 17. Shaft 18 represents the center axis of drum 1. Cards, such as unit record recording cards, tab cards or the like, are supplied by a suitable card supply source 14. Card supply source 14 may be any suitable supply source including appropriate rollers, webs or the like for supplying cards to the surface of drum 1. Drum 1 is fabricated of or is surfaced with a polyurethane material which establishes a relatively large coefficient of friction between the drum and card 20. After operation by the reader assembly, drum 1 delivers the cards to a suitable card receiver 15. Card receiver 15 may include suitable rollers, webs or the like for receiving the cards and operating thereupon. Card receiver 15 may be any suitable card storage bin or the like.

Transducer 2 is, in this embodiment, an optical read head which includes one or more suitable light pipes or fiberoptic elements 10 and 12. Fiberoptic element 10 conducts light from source 11 which may be any suitable lamp or light source. The light conducted by element 10 radiates therefrom at the end thereof into the read zone 50 associated with read head 2. Fiberoptic element or bundle 12 conducts light reflected from the cards in the read zone 50 to photodetector 13. Typically, a plurality of fiberoptic elements (for example 26 in number) is arranged in two rows across read head 2. One row of elements is combined in a fiberoptic bundle associated with the light source while the other row (and bundle) is associated with the photodetector. The fiberoptic bundles 10 and 12 are molded into read head 2 which may be a glass filled phenolic.

As is seen, read head 2 is mounted on a generally L-shaped bracket 3 by means of suitable mounting screws or bolts 9. Bracket 3 is typically mounted on a base plate which forms a portion of the machine in which the read head assembly is utilized. This mounting is represented by the cross-hatched lines. The combination of bracket 3 and read head 2 is mounted adjacent to, but spaced from the surface of drum 1. Moreover, the surface of bracket 3 and the surface of read head 2 subtand an obtuse angle opposite the surface of drum 1.

An input pinch roller 7 is mounted on a suitable bracket 6 which is also attached to the base plate of the machine as described supra. Similarly, output pinch roller 4 is mounted by means of bracket 5 to the base plate of the assembly. Pinch rollers 4 and 7 are spring loaded to act as idler rollers and to assure that the card is properly held against the surface of drum 1 and to prevent movement of the card which has been supplied to drum 1 in an appropriate position as controlled by card supply source 14. That is, through the action of rollers 4 and 7 the card 20 is prevented from moving out of alignment with the read head whereby edge guide means are eliminated.

In operation, card supply source 14 supplies cards which are properly aligned and applied to the surface of drum 1. The card is maintained in relation to the surface of drum 1 by means of pinch roller 7. The card, when in the position shown by the solid line 20, is passed into engagement with the surface 3A of bracket 3. Thus, bracket 3 (at surface 3A) constrains card 20 and forces card 20 to be deformed and the leading edge thereof brought into engagement with the surface 2A of read head 2. The angular relationship between the surfaces 2A and 3A, as well as the surface of drum 1, cause card 20 to strike surface 2A at an obtuse, glancing angle. Thus, as drum 1 continues to rotate, carrying with it card 20, the leading edge of card 20 slides along or wipes the surface 2A of read head 2. That is, the leading edge of card 20 follows and is illustrated by the leading edge, in dashed outline, of card 20A. When the card is in the position represented by card 20A, the reading zone portion of the surface 2A of read head 20 is being wiped by the leading edge of card 20A. The relationship of the several surfaces noted supra is such that the leading edge of the card is assured of wiping the read head surface beyond the read zone.

As drum 1 continues to rotate, the card is driven thereby and is constrained by the trailing edge of surface 2A and brought into engagement with pinch roller 4. Thus, the card 20B is constrained to follow the contour of drum 1. When the card assumes the configuration as represented by dashed line card 20B, it is seen that a gap is provided between surface 2A of read head 2 and the surface of the card adjacent read zone 50. As suggested supra, in an optical card reader of the reflective type, this gap is required at the optical read zone. That is, the light from fiberoptic bundle 10 irradiates the card and is detected by fiberoptic bundle 12.

Thus, there is shown and described a self-cleaning read head assembly which is especially useful in optical card readers of the reflective type. In this assembly, each card is supplied to the read head assembly in such a manner that the leading edge of the card wipes the surface of the read head thereby removing any accumulation of dust or dirt or the like. However, the card is further constrained by the surface of the read head assembly, in conjunction with the prime mover or drum, such that the card is maintained in a spaced relationship relative to the read head surface at a critical reading zone when the information on the card is to be detected.

The embodiment shown and described is illustrative only. It is not meant to be limitative of the invention. Rather, the scope of the invention is to be defined by the claims appended hereto.

What is claimed is:

1. Apparatus for reading unit records comprising, in combination:

rotatable drum means;

means for supplying indicia containing unit records serially to the surface of said drum means, whereby said unit records are moved as said drum is rotated, said unit records having a tendency to move away from the surface of said drum means and become tangential thereto;

optical reading means including optical transducer means terminating in a planar surface, said planar surface spaced from and facing said drum means and forming an acute angle with a tangent to said drum means, said planar surface having a front portion first passed by a unit record and a rear portion spaced substantially closer to the drum than said front portion, the angle made by said planar surface being such that the leading edge of a unit record driven by the drum strikes said planar surface in front of said transducer termination, then scrapes along said surface until a point beyond said termination, then is guided back against the drum surface so that the unit record is spaced from said termination of said optical transducer means during the movement of the major portion of the unit record past said termination by said drum means.

2. Apparatus for sensing indicia containing documents comprising, in combination:

transducer means having a surface through one restricted portion of which said document is read and which restricted portion tends to accumulate dirt;

drive means including a rotatable drum for driving a document past said transducer means leading edge first, and including means for maintaining said document in contact with the surface of said drum; and guide means for causing the leading edge of said document first to engage a part of said surface in front of said restricted portion and then to scrape along said surface to a point beyond said restricted portion, removing accumulated dirt in the process.

3. Apparatus for sensing indicia containing documents comprising, in combination:

transducer means having a surface through one restricted portion of which said document is read and which restricted portion tends to accumulate dirt;

drive means for driving a document past said transducer means leading edge first;

first guide means for causing the leading edge of said document first to engage a part of said surface in front of said restricted portion and then to scrape along said surface to a point beyond said restricted portion, removing accumulated dirt in the process; and second guide means positioned to engage the leading edge of said document after it has reached a point beyond said restricted portion of said surface of said transducer means, for causing said document to follow a path such that the surface of said document is spaced from said restricted portion of the surface of said transducer means during the reading of said document by said transducer means.

4. The combination as set forth in claim 3 wherein said transducer means comprises an optical read head, and said document to be sensed includes a medium which is sensed by said optical read head in a reflective operation.

5. The combination as claimed in claim 3 wherein said first and second guide means and said optical read head are arranged in a physical combination to constrain said document in a controlled form such that said document initially wipes the surface of said optical read head and is subsequently spaced from said surface as said document is moved past said optical read head.

6. The combination as set forth in claim 3 wherein said second guide means comprises a portion of said transducer means.

* * * * *